United States Patent
Anderson

(10) Patent No.: US 10,489,133 B2
(45) Date of Patent: Nov. 26, 2019

(54) SOFTWARE PLATFORM PROVIDING DEPLOYMENT AND CONFIGURATION SETTINGS FOR A SECOND PLATFORM

(71) Applicant: Fonteva, Inc., Arlington, VA (US)

(72) Inventor: Thomas M. Anderson, Alexandria, VA (US)

(73) Assignee: Fonteva, Inc., Arlington, VA (US)

( * ) Notice: Subject to any disclaimer, the term of this patent is extended or adjusted under 35 U.S.C. 154(b) by 0 days.

(21) Appl. No.: 14/742,231

(22) Filed: Jun. 17, 2015

(65) Prior Publication Data

US 2015/0363179 A1  Dec. 17, 2015

Related U.S. Application Data

(60) Provisional application No. 62/013,261, filed on Jun. 17, 2014.

(51) Int. Cl.
*G06F 8/61* (2018.01)

(52) U.S. Cl.
CPC .................... *G06F 8/61* (2013.01)

(58) Field of Classification Search
None
See application file for complete search history.

(56) References Cited

U.S. PATENT DOCUMENTS

| | | | |
|---|---|---|---|
| 7,454,429 B2 | 11/2008 | Rojer | |
| 7,478,408 B2 | 1/2009 | Sesma | |
| 7,631,291 B2 | 12/2009 | Shukla et al. | |
| 7,698,633 B2 | 4/2010 | Rojer | |
| 7,788,201 B2 | 8/2010 | Gschwind et al. | |
| 8,381,205 B2* | 2/2013 | Burke | G06F 11/004 717/168 |
| 8,533,229 B2 | 9/2013 | Choi et al. | |
| 2003/0236576 A1* | 12/2003 | Resnick | G05B 15/02 700/9 |
| 2011/0283269 A1* | 11/2011 | Gass | G06F 8/65 717/168 |
| 2012/0167178 A1 | 6/2012 | Rauh et al. | |
| 2014/0006580 A1 | 1/2014 | Raghu | |
| 2014/0052867 A1* | 2/2014 | Lucovsky | H04L 63/0245 709/226 |
| 2014/0109046 A1* | 4/2014 | Hirsch | G06F 9/44 717/120 |
| 2014/0130036 A1* | 5/2014 | Gurikar | G06F 8/61 717/176 |

(Continued)

OTHER PUBLICATIONS

Alisa Devlic, Context-addressed communication dispatch, KTH Information and Communication Technology, Apr. 2009, KTH Communication Systems, Stockholm, Sweden.

(Continued)

*Primary Examiner* — Daxin Wu
(74) *Attorney, Agent, or Firm* — Schott, P.C.

(57) ABSTRACT

A platform on a platform system has a first platform that provides deployment and configuration settings for applications developed on the platform; and a second platform developed using the deployment and configuration settings provided by the first platform. The second platform provides second deployment and second configuration settings, and the second platform also provides services that allow second applications to interact with the first platform through the second platform services.

19 Claims, 7 Drawing Sheets

(56) References Cited

U.S. PATENT DOCUMENTS

| | | | | |
|---|---|---|---|---|
| 2014/0149187 A1* | 5/2014 | Farhat | ................ | G06Q 10/0637 |
| | | | | 705/7.36 |
| 2014/0244716 A1* | 8/2014 | Stam | ....................... | H04L 67/10 |
| | | | | 709/203 |
| 2014/0280961 A1* | 9/2014 | Martinez | ............. | H04L 41/5054 |
| | | | | 709/226 |
| 2015/0100830 A1* | 4/2015 | Nanjundappa | ...... | G06F 11/3688 |
| | | | | 714/38.1 |

OTHER PUBLICATIONS

Quian Cui, Data-Oriented Exception Handling, Computer Science Technical Report Series, Jan. 1990, University of Maryland, College Park, Maryland.

\* cited by examiner

SOFTWARE PLATFORM PROVIDING DEPLOYMENT AND CONFIGURATION SETTINGS FOR A SECOND PLATFORM

BACKGROUND

Platform technology enables the creation of applications and processes using the properties of the existing platform. Oracle, Amazon, VMWare, Microsoft, and Salesforce all produce platforms, and particular cloud-based platforms, that they sell as a service. This business model is called Platform as a Service (PaaS).

The advantage of platforms is that they provide an already-developed backend for running complex applications. Thus, for someone familiar with the platform, they save significant hours of programming by providing application developers with a feature-laden environment that they do not have to develop for themselves.

In this platform as a service model, the application developer creates the software using tools and libraries from the platform provider, for example Salesforce. The developer may also control software deployment and configuration settings. The platform provider provides the networks, servers, storage, and other services that are required to host the developer's application.

One of the challenges that a developer faces, however, when using a PaaS is that he is slave to the platform's rules. Thus, it may require many unnecessary steps to perform an installation or update to the application because the developer must meet all the PaaS's requirements. Or an update or new application may get hung up in deployment due to delays or triggers set out in the PaaS that the developer did not know about.

SUMMARY OF THE EMBODIMENTS

A platform on a platform system comprises: a first platform that provides deployment and configuration settings for applications developed on the platform; and a second platform developed using the deployment and configuration settings provided by the first platform, wherein the second platform provides second deployment and second configuration settings, wherein the second platform provides services that allow second applications to interact with the first platform through the second platform services.

DETAILED DESCRIPTION OF THE EMBODIMENTS

The platform on a platform (PoP) described herein seeks to overcome some of the challenges described above. For the sake of the application discussed herein, the platform is shown as a cloud-based platform although non-cloud-based platforms are possible.

Figure 1:
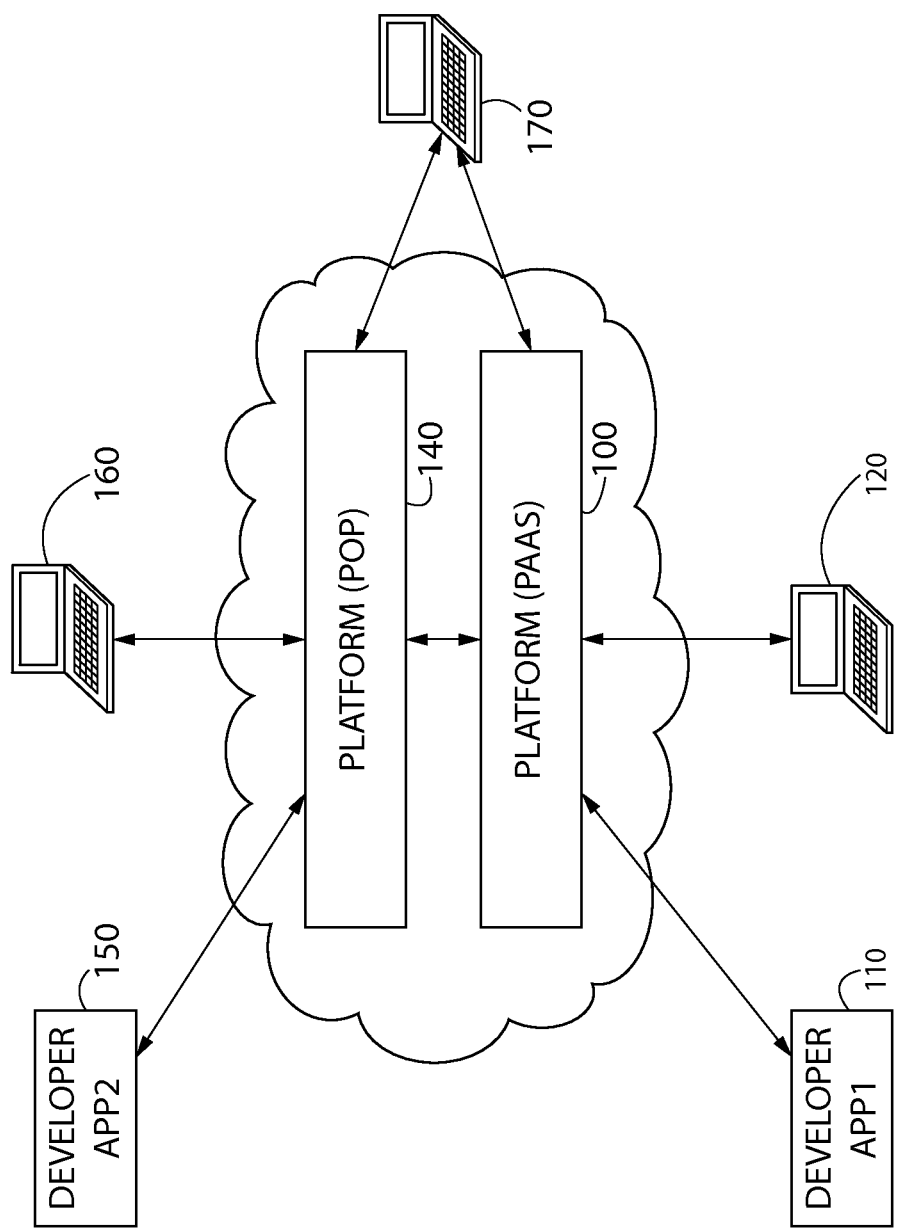
FIG. 1 shows a representation of the platform, developer, and user interface.

FIG. 1 shows an overview of the PoP architecture including a PaaS 100 that provides its platform for application development. An application developer of APP1 110 develops an application using the PaaS 100 in the known manner and this application would be available and updatable through the PaaS to a user 1 120. This is the known model.

Similar to developing an application, a platform on a platform (PoP) developer would program its own PoP 140 on top of the PaaS 100. Such a PoP 140 would have to maintain the integrity of following the PaaS rules and protocols, but it could choose how best to do that, and/or provide different (often improved) rules and protocols for its own developers. The PoP 140 would provide a unique platform to allow an APP2 developer 150 to develop its own applications. A user2 160 could use the APP2 developer 150's application through the PoP 140. In this way, the user2 160 may have no direct interaction with the PaaS 100, and only interact with the PoP 140. This can be an advantage to the user2 160 because the PoP 140 may have features that are better than the PaaS 100, such as easier updating of applications, which may allow for faster updates that do not require software reinstallation, for example.

As shown in FIG. 1, a user3 170 may use applications from both the PoP 140 and PaaS 100.

FIGS. 2-7 describe several services that allow the PoP 140 to work on top of the PaaS 100, and interact with the APP2 developer 150 and users 160, 170. The concept is that through configuration changes and less code manipulation, objects can be coupled together using metadata in a multi-tenant environment, and thus grant control to the PoP 140 that exists independent as a platform from the PaaS 140.

Configuration Service

Figure 2:
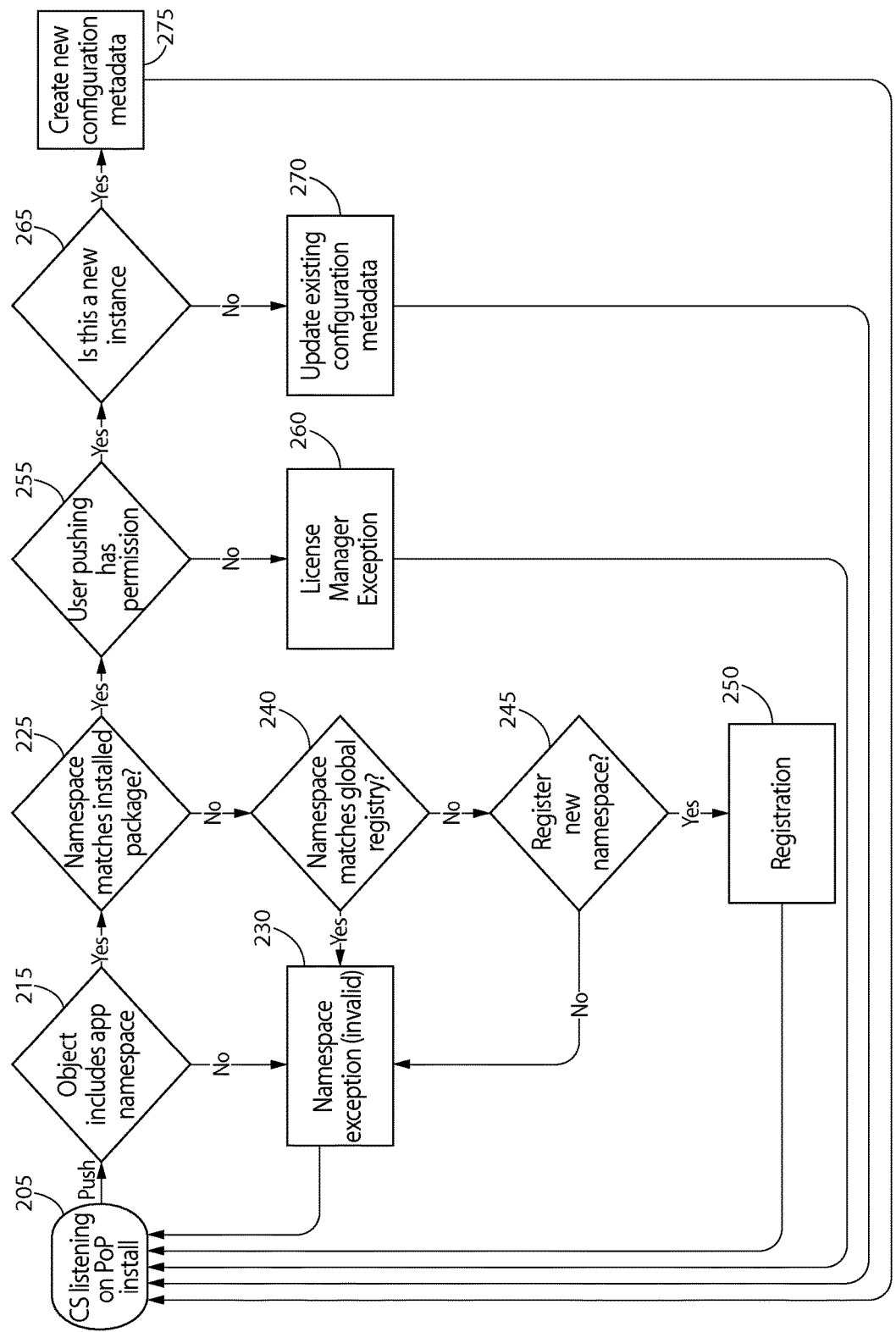
FIG. 2 is a flowchart showing the configuration service.

FIG. 2 shows a configuration service that could run on the PoP 140. The configuration service confirms that an application developer can update or create an application on the PoP 140.

The configuration service may be always listening for a developer's installation or update 205. When a developer tries to perform an installation or update, the PoP first checks to ensure that the developer's object or application includes an app namespace 215, which may be a requirement. If the developer's application or object does not include the app namespace, the PoP generates an error 230 and returns to listening 205.

If the developer's object or application has an app namespace, the PoP checks to see if the namespace matches an installed package 225. This is a check to make sure the namespace exists—if it does not, the PoP then checks to see if the namespace matches the global registry 240, and if it does, generates a namespace exception 230, and returns to listening 205. If there is no match in the global registry, the PoP may prompt the user to register a new namespace 245 (or this prompt may not be necessary as it may be predetermined by the developer). If the new namespace is not to be registered, the PoP generates the namespace exception 230 and returns to listening 205.

If the new namespace is to be registered, the PoP will proceed to register the namespace 250 and return to listening 205.

If the namespace matches the installed package, the PoP checks to see if the developer has permission to perform the installation or update 255. This check may be done by confirming a permission flag related to the developer account performing the update or installation configuration. If the developer does not have permission to perform the update or installation, a PoP license manager generates an exception 260 and the PoP returns to listening 205.

If the developer has permission, the PoP checks to see if the developer's object or application is a new instance or an update 265. If it is an update, the PoP updates the configuration requested and returns to listening. If it is a new installation, the PoP creates a new configuration 275 and returns to listening 205.

License Manager Service

Figure 3:
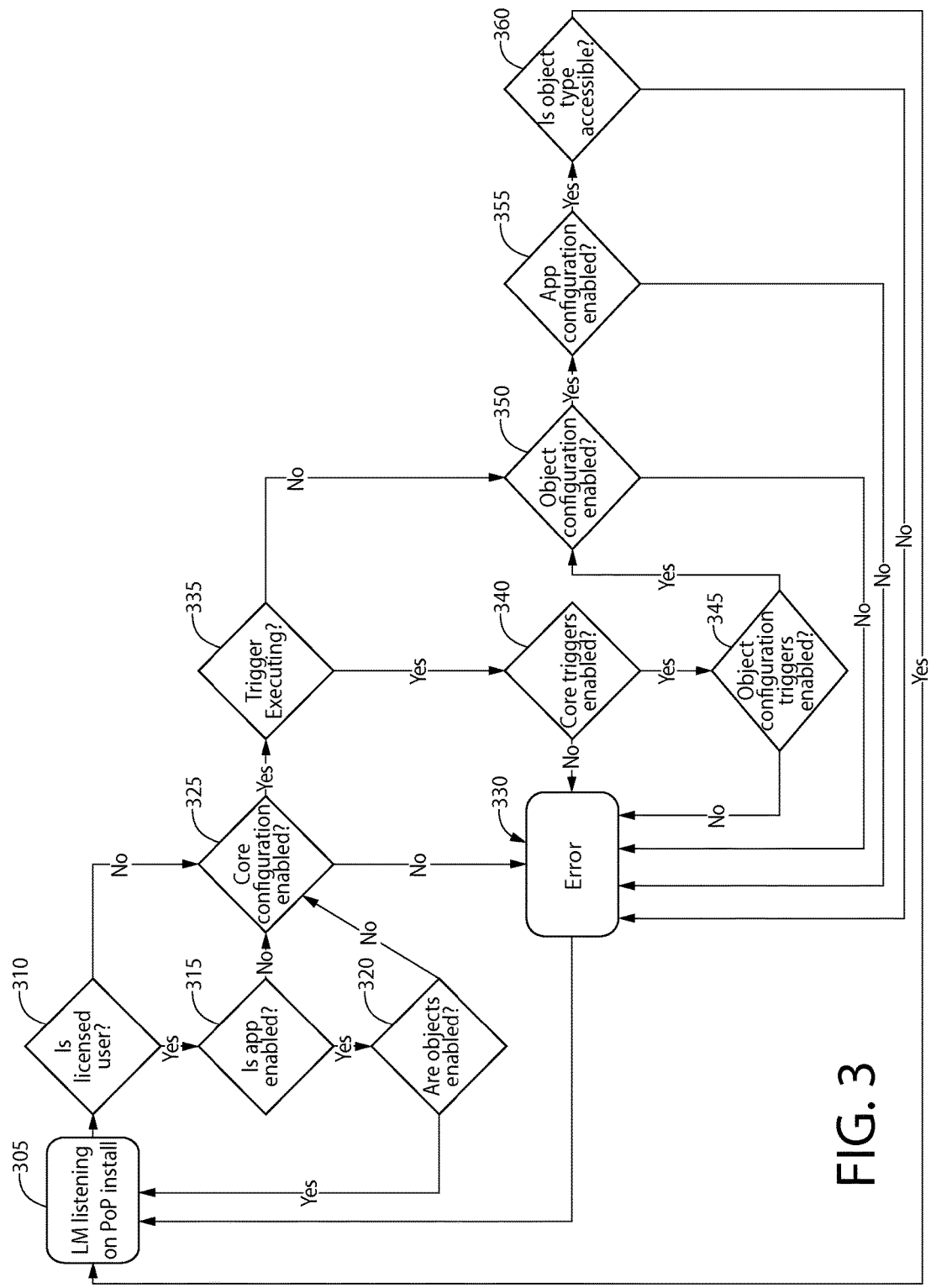
FIG. 3 is a flowchart showing the license manager service.

The license manager service, shown in FIG. 3, checks to see if certain installation and activity activities are permitted. This is an ongoing check of the developer's installation and update against rules set up in the PoP.

The service begins with the license manager listening for an installation 305. Upon an installation or update initiated by a developer, the PoP first checks to see if the developer is licensed to perform the install 310. If the developer is licensed, the PoP then confirms that the app is enabled 315 and if it is, the PoP confirms that the object is enabled 320. If the developer is licensed with an enabled application and object, the license manager returns to listening 305.

If, however, the developer is unlicensed, the application is not enabled, or the object is not enabled, the PoP then checks to confirm if the core configuration is enabled 325. (This could be important in an instance where the core is disabled.) If the core configuration is not enabled, the PoP returns an error message 330 and resumes listening 305.

If the core configuration is enabled, the PoP then checks to see if a trigger is executing 335. This check could also be a check to confirm that a trigger is not awaiting execution. Examples of such triggers may be for a data or code update.

If a trigger is executing or pending execution, the PoP confirms whether core triggers for generating objects are enabled 340. If not, the PoP returns an error 330. If the core triggers for generating objects are enabled, the PoP confirms that object configuration triggers are enabled 345. If they are not, the PoP returns an error 330 and returns to listening 305.

If a trigger is not executing 335 or if the object configuration triggers are enabled 345, the PoP then confirms that object configuration is enabled 350, application configuration is enabled 355, and that the object type is accessible 360 and if all of these are confirmed, the PoP returns to listening 305. If any of these are not true, the PoP returns an error 330 before returning to listening 305.

Dispatcher Service

Figure 4:
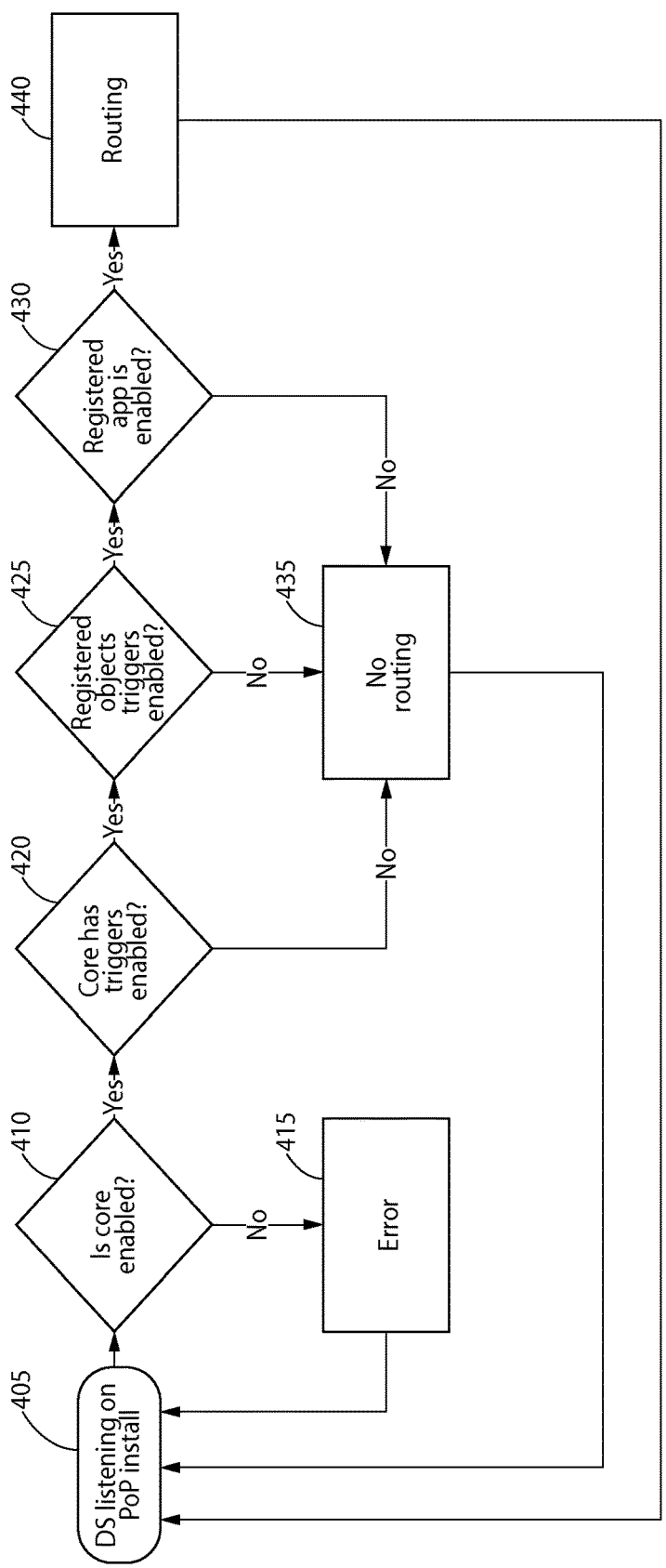
FIG. 4 is a flowchart showing the dispatcher service route.
Figure 5:
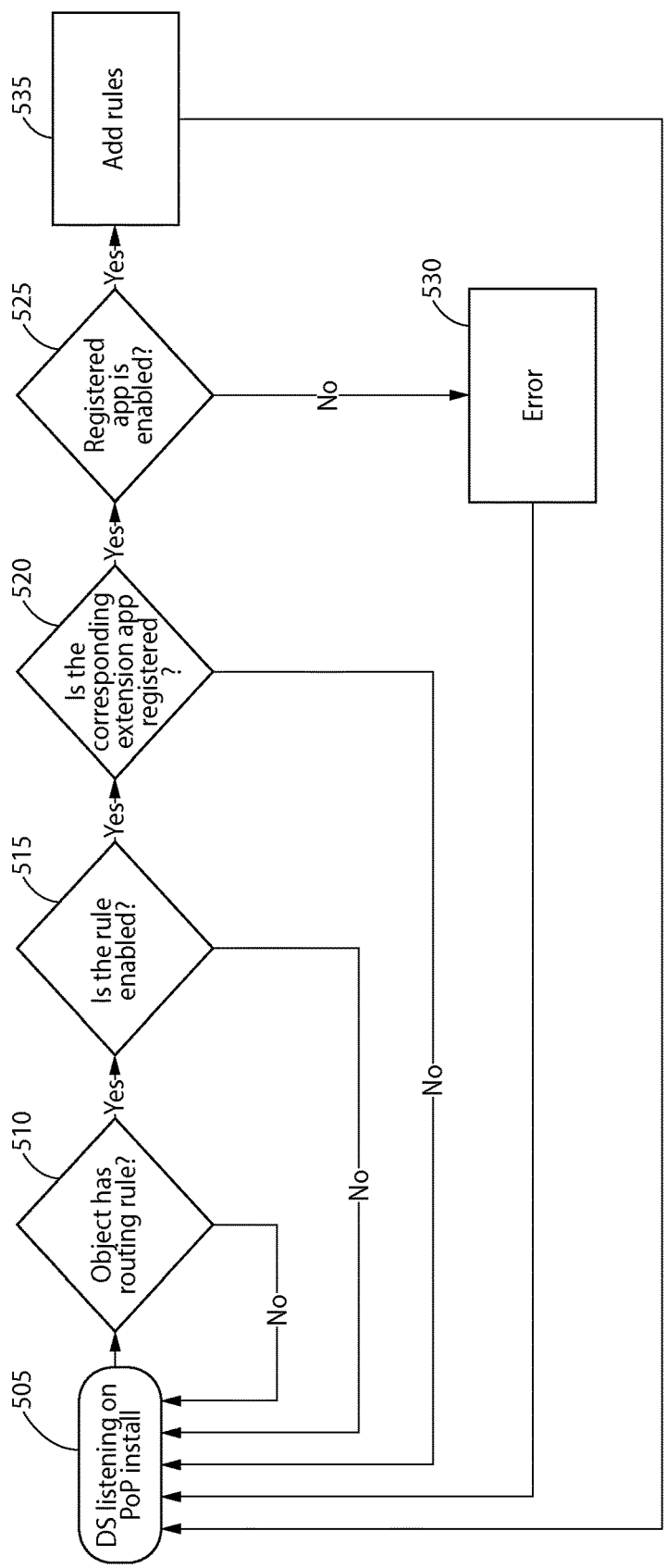
FIG. 5 is a flowchart showing the dispatcher service extension.

FIGS. 4 and 5 show the dispatcher service route and dispatcher service extension. These logic flows are in place to oversee how the application developer's application has access to the PaaS 100 though the PoP 140, and ensure that the application being developed or updated meets the requirements of the PaaS 100.

Routing rules, mentioned in more detail in FIG. 5, control the behavior of how the PoP routes logic for processing when objects are inserted, updated, and deleted from a database. The rules might include triggers, batches, and schedule types. Every new object installed needs a new rule.

The dispatcher route service in FIG. 4 starts with the dispatcher service listening for a developer installation or update 405. If there is an update or install, the PoP first checks if the core is enabled 410 and if it is not, the PoP generates an error message 415 and returns to listening 405. If the core is enabled, the PoP confirms that the core has triggers enabled 420, registered object triggers enabled 425, and that the registered application is enabled 430. If any of these cannot be confirmed, there is no routing to the PaaS 435, and the PoP returns to its listening state 405. If all of these are confirmed, the PoP routes the object-specific trigger logic through to the PaaS 440.

FIG. 5 shows the dispatcher service extension that works with the dispatcher service route of FIG. 4 by adding logic steps to it.

The dispatcher service extension begins by listening for a developer installation or update 505. During an installation, the PoP confirms (1) that the object has a routing rule 510, (2) that the rule is enabled 515, (3) that the corresponding extension application is registered 520, (4) and that the registered application is enabled 525. If any of the first three cannot be confirmed, the PoP returns to its listening status 505. If the registered application is not enabled, the PoP generates an error 530 before returning to listening 505.

If the PoP confirms all of these, it will then add and/or update the rules required by the developer's application to insure that it can access the PaaS resources via the PoP 535.

Domain Meta Service

Figure 6:
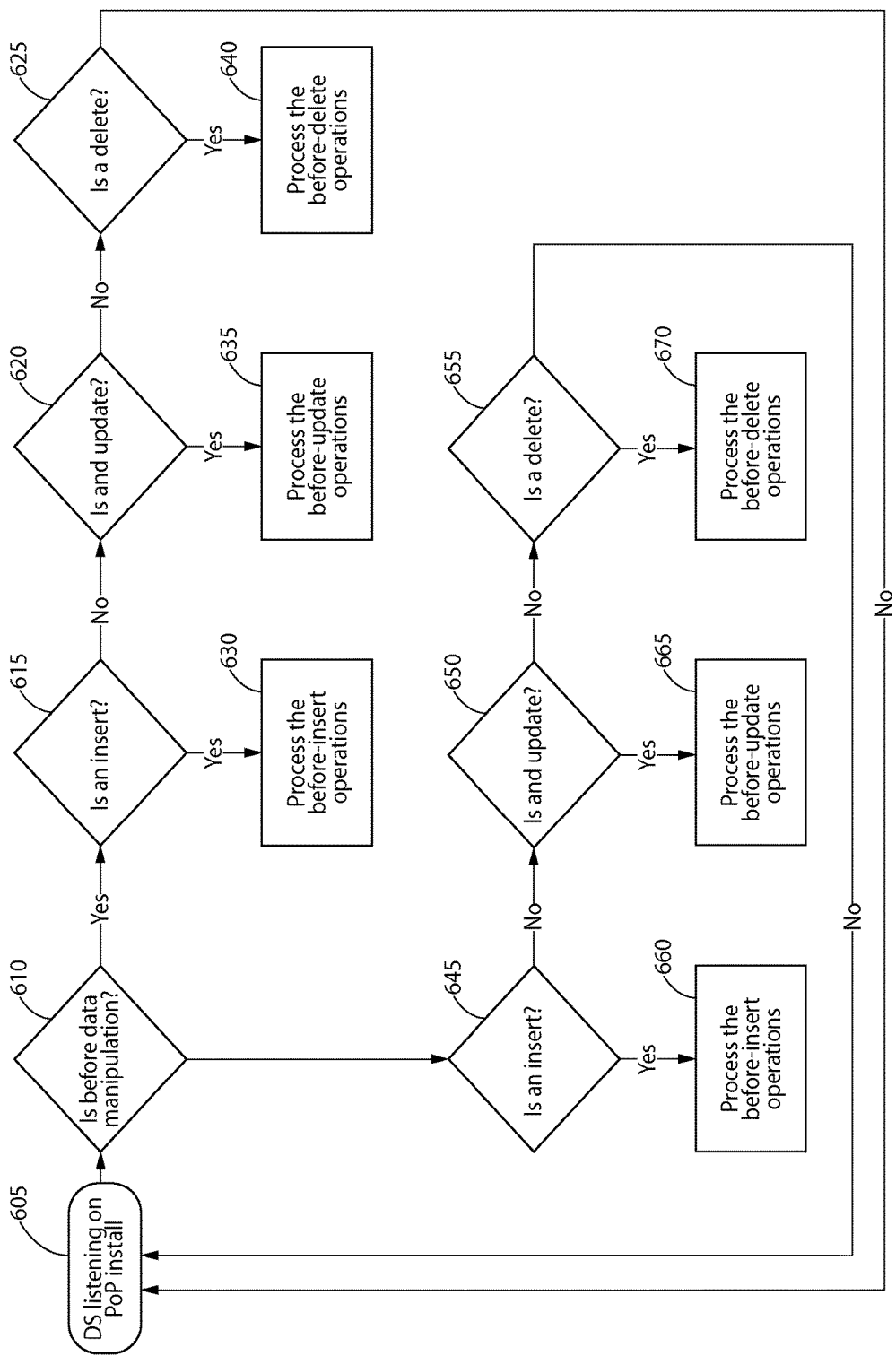
FIG. 6 is a flowchart showing the domain meta service.

FIG. 6 shows the domain meta service that determines which service or function the PoP should call.

The domain meta service begins by listening for an installation or update 605. After an installation or update is confirmed, the PoP determines if what is being requested in the installation is before data manipulation 610. If it is, the PoP then decides in turn, if the request is an insert 615, update, 620, or delete 625. If any of these are confirmed, the PoP processes the before-insert operations 630, before-update operations 635, or before-delete operation 640. If the answer is no to all of them, the PoP domain meta service returns to its listening state 605.

If what is being requested is after data manipulation, the same confirmation as to insert, update, and delete occurs 645, 650, 655 with corresponding after-insert, after-update, and after-delete processing 660, 665, 670.

Install Service

Figure 7:
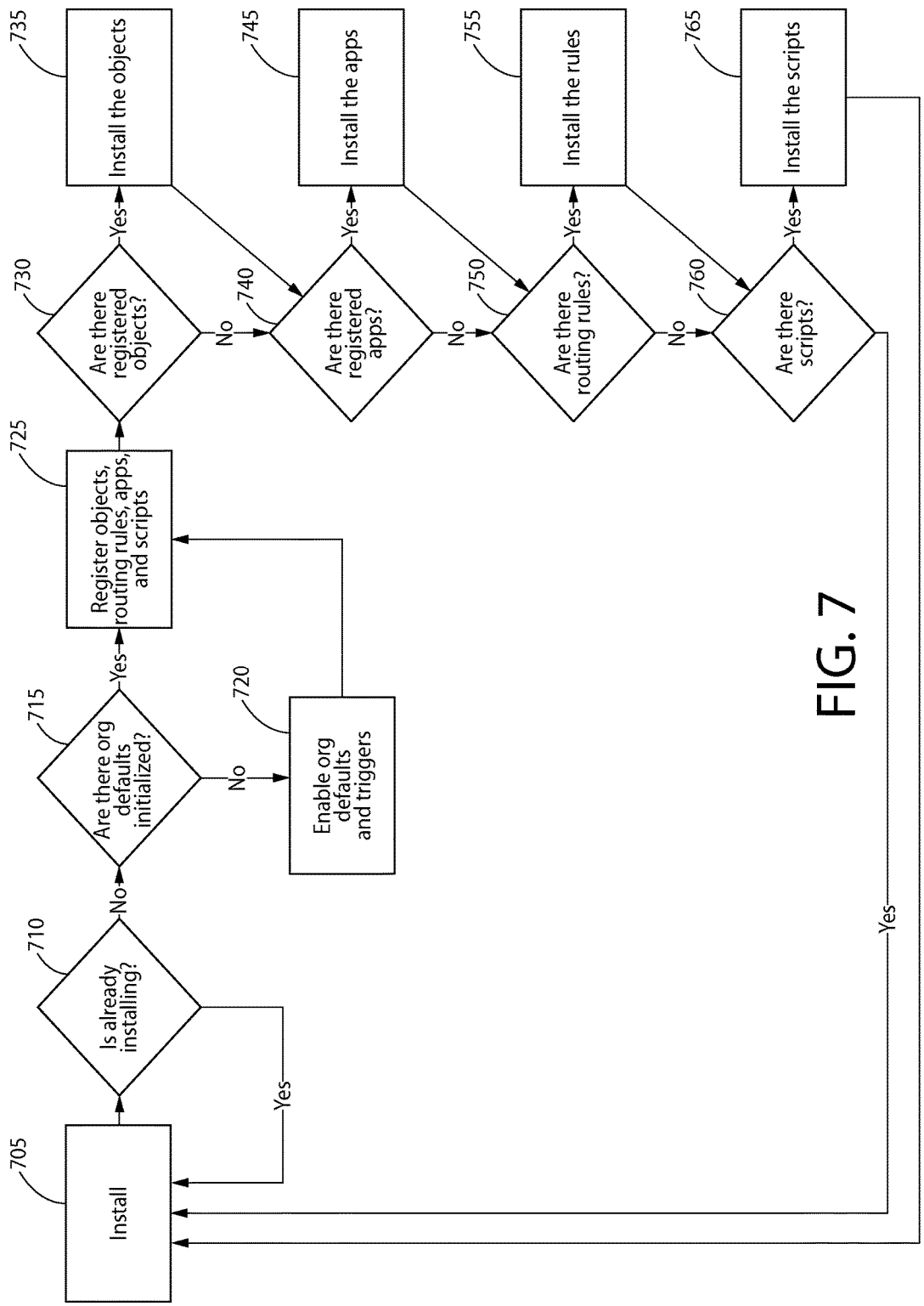
FIG. 7 is a flowchart showing the install service.

The install service shown in FIG. 7 describes the steps taken in order to install an application. The first step is listening for installation 705. Following the installation initialization, the PoP confirms whether the application or update is already installing 710. If it is, the PoP returns to its listening state 705. If the application is not already installing, the PoP confirms if organizational defaults are initialized 715. If they are not, the PoP enables the defaults and triggers 720. The PoP then proceeds to register objects, routing rules, apps, and scripts 725.

After registration, the PoP confirms that there are registered objects 730, apps 740, rules 750, and scripts 760. If any of these are not present, the PoP installs them 735, 745, 755, 765, and returns to its listening state 705.

The above described embodiments are merely illustrative of numerous and varied embodiments which may constitute applications of the principles of the invention.

The invention claimed is:

1. A second platform on a first platform system, having a hardware processor, the second platform on a first platform system comprising:
   a first platform that provides first deployment and first configuration settings for first applications developed on the first platform; and a second platform that provides second deployment and second configuration settings for second applications developed on the second platform, wherein:
the second deployment and the second configuration settings are based on the first deployment and the first configuration settings,
the second deployment and the second configuration settings are different from the first deployment and the first configuration settings,
the second platform facilitates a user to update the second applications via the second platform without reinstallation of one or more software applications and without user interaction with the first platform,
the second platform provides services that allow the second applications to interact with the first platform through the second platform services, and
one of the services provided by the second platform comprises a dispatcher service that ensures that an application, of the second applications, meets requirements of the first platform during an attempted installation of the application, wherein the dispatcher service confirms that during installation of the application of the second applications, (1) the application of the second applications has a routing rule, (2) the routing rule is enabled, (3) the application of the second applications is registered, (4) and the application of the second applications is enabled.

2. The second platform on a first platform system of claim 1, wherein another one of the services provided by the second platform comprises a configuration service that confirms that another application, of the second applications, can be updated or created on the second platform.

3. The second platform on a first platform system of claim 2, wherein the configuration service, upon an attempted installation of the another application, checks to ensure that the another application has an app namespace.

4. The second platform on a first platform system of claim 3, wherein if the app namespace does not exist, the second platform checks whether the app namespace matches a global registry, wherein if the app namespace matches the global registry, the second platform creates an exception, and wherein if the app namespace does not match the global registry, the second platform begins a registration process to register a new app namespace.

5. The second platform on a first platform system of claim 4, wherein if the app namespace does not match the global registry and no new app namespace is registered, the second platform generates another exception.

6. The second platform on a first platform system of claim 1, wherein another one of the services provided by the second platform comprises a license manager service that confirms whether installation of another application, of the second applications, is permitted.

7. The second platform on a first platform system of claim 6, wherein the license manager service, upon an attempted installation of the another application, checks to ensure that a source of the installation is permitted to perform the installation.

8. The second platform on a first platform system of claim 7, wherein if the source is permitted, the license manager service confirms that an object within the installation is enabled, and in an event that the source is permitted and the object is enabled, the license manager service approves the installation.

9. The second platform on a first platform system of claim 8, wherein if the source is not permitted and/or the object is not enabled, the license manager service checks whether a core configuration is enabled, and wherein if the core configuration is not enabled, the license manager service returns an error message.

10. The second platform on a first platform system of claim 9, wherein if the core configuration is enabled, the license manager service checks to see if a trigger is executing.

11. The second platform on a first platform system of claim 1, wherein the dispatcher service checks whether a core is enabled, wherein if the core is not enabled, the dispatcher service returns an error, and wherein if the core is enabled, the dispatcher service checks to ensure that a registered application is enabled.

12. The second platform on a first platform system of claim 1, wherein another one of the services provided by the second platform comprises a domain meta service that determines which service or function the second platform should call.

13. The second platform on a first platform system of claim 1, wherein another one of the services provided by the second platform comprises an install service that confirms one or more steps taken in order to install another application of the second applications.

14. A method to install and update an application on a second platform that was developed on top of a first platform, the method comprising:
providing, by the first platform, first deployment and first configuration settings for first applications developed on the first platform;
developing a second platform that provides second deployment and second configuration settings for second applications developed on the second platform, wherein:
the second deployment and the second configuration settings are based on—the first deployment and the first configuration settings provided by the first platform, and
the second deployment and the second configuration settings are different from the first deployment and the first configuration settings; and
installing an application, of the second applications, on the second platform, wherein the second platform provides services that allow the second applications to interact with the first platform through the second platform services, and
the second platform facilitates a user to update the second applications via the second platform without reinstallation of one or more software applications;
one of the services provided by the second platform comprises a dispatcher service that ensures that an application, of the second applications, meets requirements of the first platform during an attempted installation of the application, wherein the dispatcher service confirms that during installation of the application of the second applications, (1) the application of the second applications has a routing rule, (2) the routing rule is enabled, (3) the application of the second applications is registered, (4) and the application of the second applications is enabled.

15. The method of claim 14, wherein one of the services provided by the second platform comprises a configuration service that confirms that an application, of the second applications, can be updated or created on the second platform.

16. The method of claim 14, wherein one of the services provided by the second platform comprises a license manager service that confirms whether the installation is permitted.

17. The method of claim 14, wherein one of the services provided by the second platform comprises a domain meta service that determines which service or function the second platform should call.

18. The second platform on a first platform system of claim 1, wherein the application meets requirements of the first platform during an attempted installation of the application through the steps comprising: confirming that a core has triggers enabled, confirming that the core has registered object triggers enabled, and confirming that the second application is enabled, and in the event that one of these steps cannot be confirmed, the dispatcher service denies the attempted installation.

19. The method of claim 14, wherein the application meets requirements of the first platform during an attempted installation of the application through the steps comprising: confirming that a core has triggers enabled, confirming that the core has registered object triggers enabled, and confirming that the second application is enabled, and in the event that one of these steps cannot be confirmed, the dispatcher service denies the attempted installation.

* * * * *